United States Patent [19]

Hirasawa

[11] Patent Number: 4,685,699

[45] Date of Patent: Aug. 11, 1987

[54] PROMOTIONAL ARTICLE

[76] Inventor: Ronald T. Hirasawa, 753 Longwood Dr., Lake Forest, Ill. 60045

[21] Appl. No.: 821,410

[22] Filed: Jan. 22, 1986

[51] Int. Cl.[4] .......................... B42D 1/00; G09B 1/00; G09B 1/04; G09F 3/00

[52] U.S. Cl. .......................... 281/15 R; 283/51; 283/52; 283/56

[58] Field of Search .......................... 281/15 R; 282/8 R; 283/40, 51, 52, 56, 63 R; 60/124.1, 539

[56] References Cited

U.S. PATENT DOCUMENTS

| | | | |
|---|---|---|---|
| 1,206,805 | 12/1916 | Bonnet | 283/56 |
| 3,275,316 | 9/1966 | Cleary, Jr. | 270/57 |
| 3,930,700 | 1/1976 | Figueres | 283/56 |
| 4,011,985 | 3/1977 | Simson | 229/68 R |
| 4,176,862 | 12/1979 | Targe | 283/64 |
| 4,305,605 | 12/1981 | Vine | 283/56 |
| 4,428,526 | 1/1984 | Riley | 229/92.8 |
| 4,506,913 | 3/1985 | Kim | 283/56 |
| 4,516,793 | 3/1985 | Kiyokane | 283/103 |
| 4,524,993 | 6/1985 | Taylor | 281/15 R |

FOREIGN PATENT DOCUMENTS

| | | | |
|---|---|---|---|
| 543905 | 1/1956 | Belgium | 281/15 R |
| 1912538 | 3/1970 | Fed. Rep. of Germany | 281/15 R |
| 132767 | 9/1919 | United Kingdom | 281/15 R |

*Primary Examiner*—Paul A. Bell
*Assistant Examiner*—Paul M. Heyrana
*Attorney, Agent, or Firm*—Willian Brinks Olds Hofer Gilson & Lione Ltd.

[57] ABSTRACT

An improved structure and method for a promotional article is provided. A multi-page structure includes one or more pages of gallery-quality paper for receiving on their first sides high quality printed reproductions suitable for retention and framing as an immediate incentive gift for the recipient, and on their second sides promotional information and/or advertisements. Redeemable coupons for use in conjunction with the promotional and/or advertising copy are also provided by a structure adapted to permit removal of the coupons without reducing the value or impact of the incentive gifts. The resulting structure may be used as a free standing insert for newspapers or other publications, or alone as a promotional brochure.

7 Claims, 4 Drawing Figures

PROMOTIONAL ARTICLE

FIELD OF THE INVENTION

The invention relates in general to promotional or advertising article and method, and in particular to a freestanding promotional insert incorporating valuable incentive gifts, promotional material, and a plurality of removable response or redemption coupons.

BACKGROUND OF THE INVENTION

Promotional articles and advertising structures play vital roles in today's society. For example, promotional articles may not only inform the public of new products and services to promote sales, but also may serve to educate the public about important not-for-profit causes. In either case, the goals of the device are to attract the reader's attention and stimulate sufficient interest to influence a desired response.

Many vehicles and structures have been developed to meet these simultaneous needs of attraction, interest and response in wide audiences. A typical structure for promotional brochures or freestanding promotional inserts in wide use today includes advertising copy presented on two sides of a sheet of paper or light card stock, with a portion of the sheet configured as removable coupons or reply cards. Often a plurality of such sheets are presented in a single insert configured for insertion into newspapers or other publications.

One such freestanding insert or stuffer suitable for automated insertion into newspapers and the like is shown in U.S. Pat. No. 3,275,316 (Cleary, Jr.). U.S. Pat. Nos. 4,011,985 (Simson) and 4,428,526 (Riley) show other arrangements incorporating reply cards or envelopes, while U.S. Pat. No. 4,516,793 illustrates a single sheet advertising device including detachable coupons.

Unfortunately, such known structures incorporating coupons redeemable for valuable gifts or other incentives require affirmative action by the recipient to receive the incentive gift. There is also substantial time delay separating the promotional message from the reward effect of the incentive gift. The resulting redemption threshold will reduce or eliminate the interest of many recipients, while the time separation of the impact of the incentive gift from the desired message of the promotion will reduce its ultimate effectiveness. Typical mail-in responses may range from less than 0.1% to 5% of circulation, with greater than 5% being unusual. Thus 0.5% is therefore generally considered average and successful.

These undesired effects may be minimized by using a promotional piece having a structure which directly incorporates the actual incentive gift, thereby providing the desired benefits without any consideration or effort by consumers beyond purchase of their regular newspaper. For example, the structure may incorporate actual sample goods, such as in Cleary (FIGS. 16,17). However, the cost of the goods themselves and of the special processing necessary to incorporate them quickly become prohibitive for mass distribution. Further, it is often desirable to offer an incentive gift that has intrinsic meaning to the message of the campaign, which may not be possible with sample goods for certain types of promotions such as fund raising campaigns.

It is therefore desirable and an object of the present invention, to provide a structure and method for a promotional article which permits alternative promotions within a single promotional piece without mutual interference (e.g., where removal of the coupon does not detract from or destroy other functions), and to minimize the cost to the promoter while maximizing the value to, and impact on, the recipient. It is highly desirable and a specific object to provide a structure and method for a promotional article which permits these goals to be met synergistically to maximize the effect of the resulting promotion for the promoter, the advertiser, and the recipient. Unfortunately, known structures for promotional articles discussed above do not provide the needed structure for such a multi-functional article.

SUMMARY OF THE INVENTION

According to the present invention, a structure and method for a promotional article such as a free-standing insert or brochure is provided. The structure includes a plurality of sheets which may be folded and/or bound by conventional techniques into multi-paged insert format. One or more of the pages may preferably be of high quality stock, such as opaque gallery-quality paper of sufficient weight and surface character to receive high quality color reproductions of artwork, scenic views, or other items of visual interest. Such high quality prints may therefore provide the recipient with a valuable immediate incentive gift of framable artwork, which may nevertheless be provided by the promoter utilizing standard printing and handling techniques.

The article may further include on the facing sides of the previously discussed pages standard promotional advertisements for various commercial products and services. By this arrangement, the impact of the advertisement is increased by its desirable proximity to the attractive incentive gift print, while the promotion does not intrude upon or detract from the value of the incentive gift itself.

To maintain integrity of the incentive gift print, redeemable coupons corresponding to the promotional advertisements are included on one or more pages separate from the pages bearing the incentive gift prints and advertisements. In this manner, removal of the coupons or reply cards for redemption will not deface the incentive gift print or detract from its value. Thus, the recipient may simultaneously retain the immediate incentive gift while also responding to the standard coupon incentive offers. It is estimated that redemption of coupons will increase 20% on average, for example from 5.0% to 6.0%. Thus a premium of 40% to 60% may be charged per thousand circulation when the present invention is utilized.

In one preferred embodiment, the reply cards or coupons are provided on the back page of the insert, and are perforated for easy removal. This page may be contiguous with the front cover of the insert in a folded fashion, and may comprise a light card stock to provide a quality cover for the front of the insert, while simultaneously providing a suitable card stock for use in reply cards which meet United States Postal Service requirements for minimum thickness and stiffness.

Other advantages, objects, and features of the present invention will become apparent upon reading the following detailed description of the preferred embodiments in conjunction with the accompanying drawings.

DESCRIPTION OF THE PREFERRED EMBODIMENTS

Figure 1:
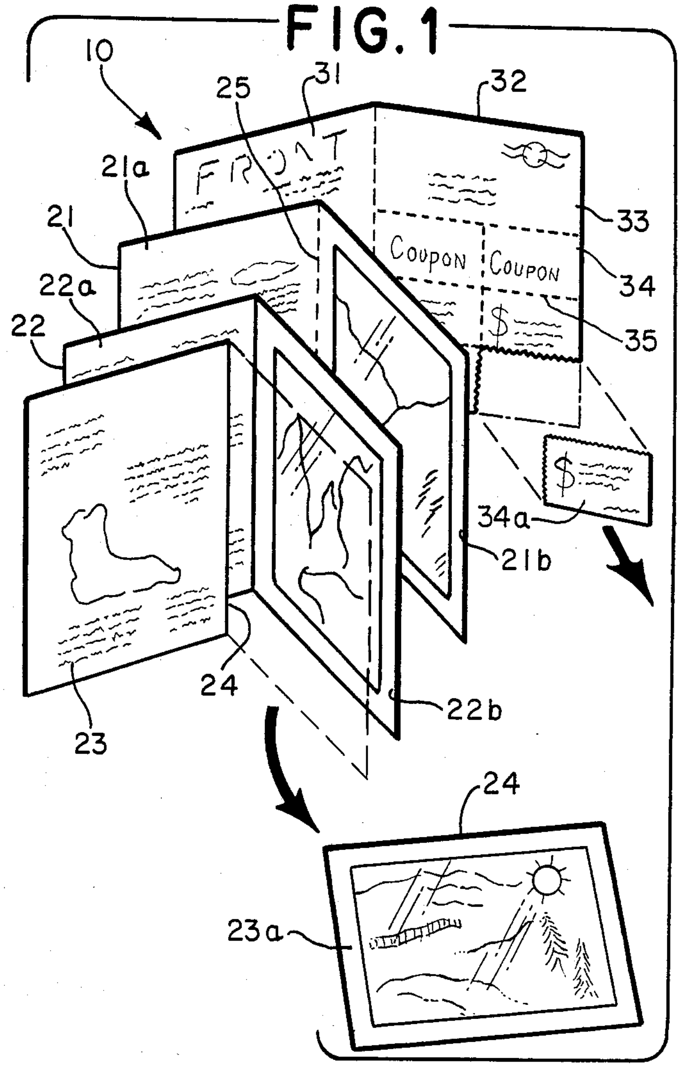
FIG. 1 is an exploded representational view of a preferred embodiment of the present invention, illustrating removable incentive gift prints and redeemable coupons.

Referring now to the drawings, FIG. 1 illustrates a preferred embodiment of a freestanding promotional insert or brochure 10 according to the present invention. Its structure includes a front cover 31, a back cover 32, and a plurality of inner sheets 21, 22, 23, which are more fully described as follows.

In the embodiment illustrated, each inner sheet includes four separate support faces for printed matter and other indicia. The sheets 21–23 are folded to provide two resulting inner pages, e.g. 21*a*, 21*b*. A greater or lesser number of inner sheets 21–23 than illustrated may of course be utilized.

Each of the folded inner pages, e.g. 21*b*, includes a front and a back side. In the present invention, one or more of the support surfaces provided by the inner pages, e.g. 21*b*, are used to support a high quality printed reproduction of some scene or item of visual interest suitable for display, such as artwork, scenic views, wildlife, photographs, renditions of historical objects, portraits, etc. Such a scene or artwork shall be referred to herein as a scene of aesthetic interest, and the resulting structure shall be referred to herein as an incentive gift print.

The stock material used to form the inner sheets, which comprise a support for such incentive gift prints, is chosen to provide the necessary qualities for high quality printed reproduction utilizing known printing and lithographic techniques. In contrast to current free-standing inserts, which utilize pulp-added paper which changes colors or fades with time, the present structure utilizes thicker "free sheet" stock having no recycled pulp. Such gallery quality stock will keep its color quality for a significantly longer period, perhaps indefinitely. The preferred embodiment utilizes 50 lb. stock for supporting the incentive gift prints. The sheet may also provide, for example, a suitably textured surface to provide visual intertest to the resulting incentive gift print.

The second side of an inner page, e.g. 21*b*, may be utilized to support printed matter relating to advertising or other promotion. The paper stock selected for the inner sheets should therefore be sufficiently opaque to permit the printed promotional matter to be supported on one or more of the back sides of the inner pages without visually interfering with the incentive gift print supported on the front side of the page.

As illustrated in the figure, a plurality of such sheets may be assembled to create the resulting free-standing insert 10. For example, the front of page 22*a* supports printed matter relating to desired advertisement or promotion, while the back side of page 22*a* provides an incentive gift print (not illustrated). Similarly, the front of page 22*b* supports an incentive gift print as shown, while the back of 22*b* supports additional promotional printed matter (not illustrated). When assembled, the promotional material on the back of page 22*b*, for example, will be opposite to the incentive gift print on the front of page 21*b* when the recipient opens the assembled promotional article. This proximate juxtaposition of the promotional material with the visually stimulating incentive gift prints results in increased attention for the advertising printed matter, which benefits the advertiser or sponsor of the freestanding insert 10.

In order to provide an immediate gift of commercial value as the incentive to the recipient, the freestanding insert 10 is designed to permit removal of the incentive gift prints so that they may be retained and used as decorative pieces by the recipient. In the embodiment shown in FIG. 1, for example, perforations 25 may be provided to assist in removal of the incentive gift print. Thus, a print such as 23*a* may be separated along its junction 24 from the remainder of inner sheet 23 as illustrated. Each remaining print may similarly be removed for future use.

In order to maximize the advantage for the advertiser, the structure of the present freestanding insert 10 further permits use of redeemable coupons and reply cards. However, as part of the present structure such cards are provided without defacing or detracting from the value of the incentive gift prints. One or more ganged sheets 32 of coupons and/or reply cards may be provided in conjunction with the inner sheets previously discussed. In this manner, redeemable coupons 33–35 are provided in a manner which permits the recipient to remove the coupon (e.g. 34*a*) for redemption without damaging or destroying the value of the printed incentive gift. This permits maximum utilization of the support surfaces provided by inner sheets 21–23, including the advantageous immediate juxtaposition of an advertisement and the high quality print on an opposing page previously discussed.

The resulting freestanding insert or brochure 10 may be assembled by means known in the art. For example, the individual inner sheets 21 may be bound at their center folds by staples or other standard binding techniques, or the inner sheets 21 may be loosely assembled within an outer cover. Protective paper or plastic sleeves may be used to retain and protect sheets 21. The resulting structure may then be utilized as a free-standing insert or stuffer for insertion into newspapers or other periodicals and as a stand-alone promotional brochure.

Figure 3:
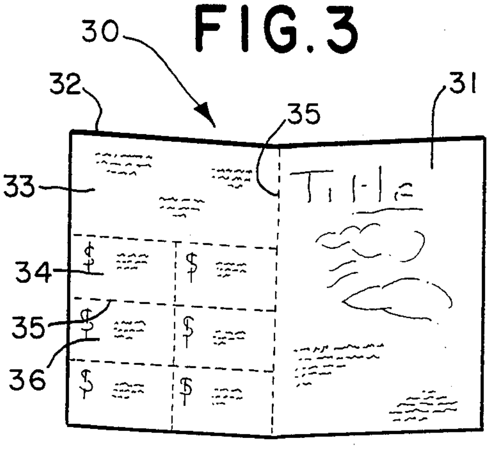
FIG. 3 is an opened view of one form of cover which may be used with the present invention.

In one preferred embodiment illustrated in FIG. 3, the freestanding insert 10 is provided with a cover 30 which includes a contiguous front cover 31 and back cover 32 printed on a single sheet of support paper stock. The ganged coupons 34, 35 are provided on back page 32 of the cover, and are preferably separated by perforations 35 to facilitate removal by the recipient. Postal reply cards 33 may also be provided. Cover 30 may be formed of a heavy paper or light card stock of greater stiffness than the inner sheets 21–23, such that the reply cards 33 will comply with postal regulation minimums for such cards, while a quality binder or cover is simultaneously provided for the freestanding insert 10.

Figure 2:
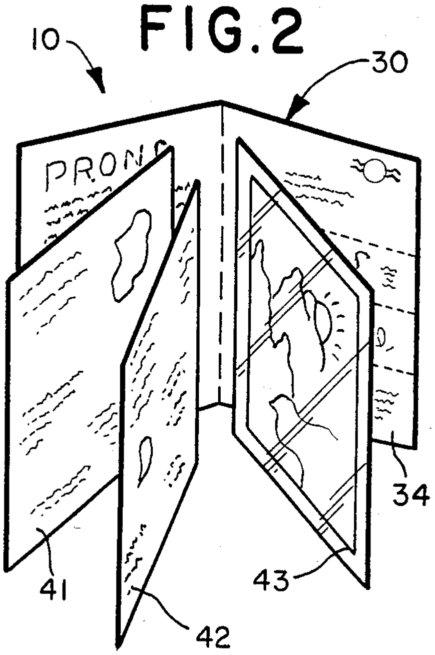
FIG. 2 is an exploded representational view of an alternative embodiment of the present invention.

FIG. 2 illustrates an alternative embodiment wherein individual inner pages 41, 42, 43 are provided, rather than folded inner sheets. One or more of these inner pages 41–43 may be provided on its first side with an incentive gift print and on its second side with promotional or advertising indicia as illustrated. These individual sheets may then be assembled within a suitable cover 30. It should be understood that the specific embodiments illustrated in FIGS. 1 and 2 may be combined in a single freestanding insert 10 within the scope of the present invention.

Figure 4:
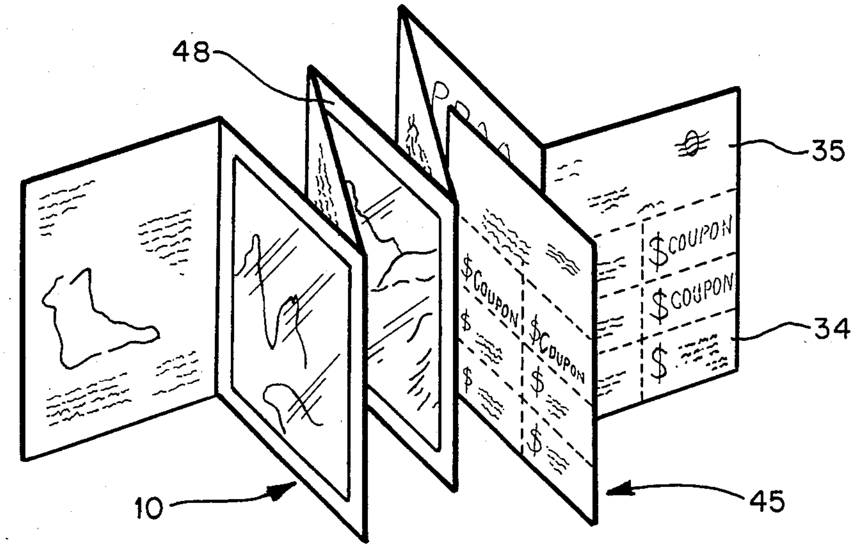
FIG. 4 is an exploded representational view of a further embodiment of the present invention.

Finally, FIG. 4 illustrates yet another alternative embodiment utilizing a "Z" folded configuration 48 of three or more pages. A sheet of ganged coupons 34 or reply cards 35 may be provided as a separate sheet 45 or as part 46 of the folded configuration 48.

Though the embodiments hereinbefore described are preferred, many modifications and refinements which do not depart from the true spirit and scope of the invention may be conceived by those skilled in the art. For example, the inventions disclosed and claimed are not limited to freestanding inserts, but are applicable to other forms of promotional articles as well. It is intended that all such modifications be covered by the following claims.

I claim:

1. A promotional article including a front cover and a back cover, and a plurality of sheets located between said covers, wherein said promotional article further comprises:

at least one removable incentive gift sheet having a first and a second side and located between said front and back covers, said at least one incentive gift sheet comprising gallery quality paper and including printed matter comprising a scene of aesthetic interest on its first side, and promotional printed matter on its second side; and a redemption card support sheet, said redemption card support sheet including at least one removable redemption card relating to said promotional printed matter on said at least one incentive gift sheet, wherein said redemption support sheet does not comprise said at least one incentive gift sheet such that removal of said redemption card does not deface said at least one incentive gift sheet.

2. The structure of claim 1 wherein said at least one incentive gift sheet comprises a plurality of incentive gift sheets proximate one another such that said first side of one incentive gift sheet is adjacent to said second side of another of said plurality of incentive gift sheets.

3. The structure of claim 1 wherein said redemption card support sheet comprises a plurality of ganged redemption cards.

4. The structure of claim 1 wherein said front and back covers comprise a unitary structure of card stock in folded relationship to one another, and wherein said redemption card support sheet comprises said back cover, such that said unitary structure simultaneously provides a protective front cover and a suitable support structure for said redemption cards.

5. A method of making a promotional article comprising the steps of:

providing a front and a back cover;

providing at least one center sheet of gallery quality paper having a first and second side;

printing a scene of aesthetic interest on the first side of said at least one center sheet;

printing promotional printed matter on the second side of said at least one center sheet;

providing means for removably maintaining said at least one center sheet between said front and back covers so that it may be subsequently removed therefrom without damage, thereby providing a removable incentive gift sheet; and providing a redemption card support sheet, said sheet including at least one removable redemption card supporting printed matter relating to said promotional printed matter, wherein said redemption card support sheet does not comprise said removable incentive gift sheet.

6. The method of claim 5 further comprising the steps of:

providing a plurality of said center sheets and positioning said center sheets so that said first side of one center sheet is adjacent to said second side of another of said plurality of center sheets.

7. The method of claim 5 further including the steps of:

providing said front and back covers as a unitary structure;

printing said removable redemption card printed matter on that portion of said unitary structure comprising said back cover, such that said back cover comprises said redemption card support sheet; and folding said unitary structure to form said front and back covers.

* * * * *